(12) United States Patent
Cotter et al.

(10) Patent No.: US 9,404,216 B2
(45) Date of Patent: *Aug. 2, 2016

(54) POLYESTER SURFACTANTS FOR DEINKING

(71) Applicant: Kemira Chemicals, Inc., Atlanta, GA (US)

(72) Inventors: Terrence Cotter, Kennesaw, GA (US); Scott Rosencrance, Douglasville, GA (US); Robert Wilson, Atlanta, GA (US)

(73) Assignee: KEMIRA CHEMICALS, INC., Atlanta, GA (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/960,007

(22) Filed: Aug. 6, 2013

(65) Prior Publication Data

US 2013/0312922 A1 Nov. 28, 2013

Related U.S. Application Data

(60) Continuation of application No. 13/657,013, filed on Oct. 22, 2012, now Pat. No. 8,524,036, which is a division of application No. 12/616,573, filed on Nov. 11, 2009, now Pat. No. 8,317,973.

(51) Int. Cl.
*D21C 5/02* (2006.01)
*C08G 63/54* (2006.01)

(52) U.S. Cl.
CPC *D21C 5/027* (2013.01); *D21C 5/02* (2013.01); *Y02W 30/648* (2015.05)

(58) Field of Classification Search
CPC .......... D21C 5/027; D21C 5/02; C08G 63/00; C08G 63/48; Y02W 30/648
See application file for complete search history.

(56) References Cited

U.S. PATENT DOCUMENTS

| | | | |
|---|---|---|---|
| 1,421,195 A | 6/1922 | Eyrich et al. |
| 3,986,922 A | 10/1976 | Parker et al. |
| 4,013,505 A | 3/1977 | Balcar et al. |
| 4,231,841 A | 11/1980 | Calmanti et al. |
| 4,360,439 A | 11/1982 | Calmanti et al. |
| 4,421,195 A | 12/1983 | Alba |
| 4,445,971 A | 5/1984 | Lappi et al. |
| 4,483,741 A | 11/1984 | Maloney et al. |
| 4,605,773 A | 8/1986 | Maloney et al. |
| 4,769,170 A | 9/1988 | Omori et al. |
| 4,780,179 A | 10/1988 | Clement |
| 4,871,483 A | 10/1989 | Friel et al. |
| 4,964,949 A | 10/1990 | Hamaguch et al. |
| 5,151,155 A | 9/1992 | Cody et al. |
| 5,225,046 A | 7/1993 | Borchardt |
| 5,227,019 A | 7/1993 | Borchardt |
| 5,259,969 A | 11/1993 | Srivatsa et al. |
| 5,288,369 A | 2/1994 | Ishibashi et al. |
| 5,308,448 A | 5/1994 | Behler et al. |
| 5,336,372 A | 8/1994 | Cody et al. |
| 5,376,237 A | 12/1994 | Ishiguro et al. |
| 5,389,200 A | 2/1995 | Cody et al. |
| 5,540,814 A | 7/1996 | Curtis et al. |
| 5,560,806 A | 10/1996 | Li et al. |
| 5,601,689 A | 2/1997 | Sacripante et al. |
| 5,632,857 A | 5/1997 | Larson |
| 5,634,969 A | 6/1997 | Cody et al. |
| 5,643,409 A | 7/1997 | Hamaguchi et al. |
| 5,651,861 A | 7/1997 | Larson et al. |
| 5,660,684 A | 8/1997 | Li et al. |
| 5,696,292 A | 12/1997 | Cody et al. |
| 5,725,730 A | 3/1998 | Smolka et al. |
| 5,736,622 A | 4/1998 | Wallberg et al. |
| 5,759,258 A | 6/1998 | Sohara et al. |
| 5,759,938 A | 6/1998 | Cody et al. |
| 5,801,135 A | 9/1998 | Miyauchi et al. |
| 5,868,826 A | 2/1999 | Fischer et al. |
| RE36,424 E | 12/1999 | Clement |
| 6,013,157 A | 1/2000 | Li et al. |
| 6,103,687 A | 8/2000 | Cody et al. |
| 6,207,771 B1 | 3/2001 | Larson |
| 6,251,220 B1 | 6/2001 | Irinatsu et al. |
| 6,387,212 B1 | 5/2002 | Christian |
| 6,426,200 B1 | 7/2002 | Yang et al. |
| 6,458,343 B1 | 10/2002 | Zeman et al. |

(Continued)

FOREIGN PATENT DOCUMENTS

| | | |
|---|---|---|
| CA | 2131677 | 3/1995 |
| DE | 4118340 | 7/1996 |

(Continued)

OTHER PUBLICATIONS

International Preliminary Report on Patentability for PCT/US2010/054609 dated May 15, 2012.

Carnahan Michael A. et al., "Hybrid dendritic-linear polyester-ethers for in situ photopolymerization," Journal of American Chemical Society, American Chemical Society, US, vol. 124, No. 19, May 15, 2002, pp. 5291-5293.

International Search Report and Written Opinion for PCT/US2010/054609 mailed Feb. 15, 2011.

(Continued)

*Primary Examiner* — Ling Choi
*Assistant Examiner* — Gennadiy Mesh
(74) *Attorney, Agent, or Firm* — Duane Morris LLP

(57) ABSTRACT

A polyester surfactant includes a condensation esterification product of a) a polyhydric alcohol, b) a dimer or trimer of an C2 to C42 acid, and c) polyethylene glycol and polypropylene glycol. The polyhydric alcohol is selected from glycerol, arabitol, sorbitol, sorbitan, mannitol, mannitan, erythritol, pentaerythritol, or mixtures thereof. The polyester surfactant is used for deinking, for example, printed waste paper. A method for deinking includes a step of contacting an aqueous pulp slurry with the addition of a composition comprising a polyester surfactant.

34 Claims, No Drawings

(56) References Cited

U.S. PATENT DOCUMENTS

| | | |
|---|---|---|
| 6,464,828 B1 | 10/2002 | Furman |
| 6,540,870 B1 | 4/2003 | Laurila-Lumme et al. |
| 6,616,748 B2 | 9/2003 | Klass et al. |
| 6,679,973 B2 | 1/2004 | Klass et al. |
| 6,784,146 B1 | 8/2004 | Luo et al. |
| 7,030,149 B2 | 4/2006 | Chang et al. |
| 7,320,976 B2 | 1/2008 | Chang et al. |
| 2002/0025295 A1 | 2/2002 | Kim |
| 2002/0066880 A1 | 6/2002 | Robinson et al. |
| 2002/0121346 A1 | 9/2002 | Nishizaki et al. |
| 2002/0142452 A1 | 10/2002 | Yang et al. |
| 2003/0051637 A1 | 3/2003 | Klass |
| 2003/0106654 A1 | 6/2003 | Li et al. |
| 2003/0205346 A1 | 11/2003 | Klass et al. |
| 2004/0038841 A1 | 2/2004 | Koga et al. |
| 2004/0039235 A1 | 2/2004 | Bergstrom et al. |
| 2004/0065419 A1 | 4/2004 | Lasmarias et al. |
| 2004/0074620 A1 | 4/2004 | Nissinen et al. |
| 2004/0079503 A1 | 4/2004 | Nissinen et al. |
| 2004/0083950 A1 | 5/2004 | Nissinen et al. |
| 2004/0096649 A1 | 5/2004 | Nissinen et al. |
| 2005/0098278 A1 | 5/2005 | Rosencrance et al. |
| 2005/0133172 A1 | 6/2005 | Robinson et al. |
| 2006/0102299 A1 | 5/2006 | Elgarhy et al. |
| 2007/0149436 A1 | 6/2007 | Boeckh et al. |
| 2007/0158039 A1 | 7/2007 | Rosencrance et al. |
| 2007/0284067 A1 | 12/2007 | Basilio |

FOREIGN PATENT DOCUMENTS

| | | |
|---|---|---|
| EP | 0122747 | 6/1985 |
| EP | 0377983 | 7/1990 |
| EP | 0488306 | 6/1992 |
| EP | 0531713 | 7/1992 |
| EP | 0705632 | 9/1995 |
| EP | 0717144 | 6/1996 |
| EP | 0741203 | 11/1996 |
| EP | 0798268 | 10/1997 |
| EP | 0737774 | 3/1998 |
| EP | 0989229 | 9/1998 |
| EP | 0815175 | 5/2000 |
| EP | 1057926 | 12/2000 |
| EP | 0981665 | 12/2001 |
| EP | 0880620 | 8/2002 |
| EP | 0969141 | 7/2003 |
| EP | 1114219 | 10/2003 |
| EP | 1995303 | 11/2008 |
| JP | 57025489 | 2/1982 |
| JP | 58215489 | 12/1983 |
| JP | 03068401 | 3/1991 |
| JP | 06-341075 | * 12/1994 |
| JP | 09111681 | 4/1997 |
| JP | 10029818 | 2/1998 |
| JP | 10088489 | 4/1998 |
| JP | 5222686 | 2/2000 |
| JP | 2000096473 | 4/2000 |
| JP | 2000129587 | 5/2000 |
| JP | 2000189712 | 7/2000 |
| JP | 200265383 | 9/2000 |
| JP | 2000246010 | 9/2000 |
| JP | 2002327384 | 11/2002 |
| JP | 2004250844 | 9/2004 |
| JP | 3659605 | 6/2005 |
| JP | 2007253014 | 10/2007 |
| JP | 2004238777 | 9/2008 |
| WO | 92/01109 | 1/1992 |
| WO | 94/28237 | 12/1994 |
| WO | 95/29289 | 11/1995 |
| WO | 96/28517 | 9/1996 |
| WO | 97/32076 | 9/1997 |
| WO | 99/35333 | 7/1999 |
| WO | 00/03092 | 1/2000 |
| WO | 03/014039 | 2/2003 |
| WO | 2004048680 | 6/2004 |
| WO | 2005/124016 | 12/2005 |
| WO | 2006089395 | 8/2006 |
| WO | 2007/081921 | 7/2007 |

OTHER PUBLICATIONS

DeLozier, Greg et al., "Enhanced flotation deinking of 100% flexographic ONP using surfactant spray technique in the presence of siloxane-based defoamer", Institute of Paper Science and Technology, Appita Annual Conference and Exhibition (57th), pp. 281-289 (2003).

Luo, James et al., "Effects of deinking surfactants on subsequent processing chemistry and paper machine runnability", Pulp Conference, Seattle, WA, Nov. 4-7, 2001, pp. 642-667.

Zhao, Yulin et al., "Roles of surfactants in flotation deinking", School of chemical and Biomolecular Engineering, Georgia Institute of Technology, Atlanta, GA, Progress in Paper Recycling, vol. 14(1), pp. 41-45 (2004).

DeLozier, Greg et al., "Reducing fiber loss in laboratory- and mill-scale flotation deinking using surfactant spray technology", Institute of Paper Science & Technology, TAPPI Paper Summit, Spring Technical and International Environmental Conference, Atlanta, GA, May 3-5, 2004 (2004 ).

DeLozier, Greg et al., "Surfactant Spray Flotation Deinking of 100% Flexographic ONP Furnish in the Presence of Conventional Defoamer," School of Chemical and Biomolecular Engineering, Progress in Paper Recycling, vol. 13(1 ), pp. 5-11 (2003).

Drelich et al., "Interfacial Chemistry Aspects of Deinking Flotation of Mixed Office Paper", Paper presented at the Annual Meeting of the Society of Mining, Metallurgy and Exploration, in Denver, CO, Feb. 26, 28, 2001.

Horeck et al., "Advances in Deinking Surfactant chemistry for Onp/Omg Systems", Paper Age Magazine, Jul. 2001 issue.

Bottiglieri, Jan, "Scott Rosencrance on Next-Generation Technology for the Paper Industry", TAPPI Journal Techlink, Paper 360, Sep. 2008.

"Not Just Your Average Pea in a Pod", TAPPI Journal, Paper 360, Aug. 2008.

Luo et al., "Foam Control Using a Foaming Agent Spray: A Novel Concept for Flotation Deinking of Waste Paper", 42 Ind. Eng. Chem. Res., 3578-3583, (2003).

* cited by examiner

POLYESTER SURFACTANTS FOR DEINKING

This application is a continuation of application Ser. No. 13/657,013 filed Oct. 22, 2012, which is a divisional application of application Ser. No. 12/616,573 filed Nov. 11, 2009 (now U.S. Pat. No. 8,317,973 issued Nov. 27, 2012), which applications are expressly incorporated by reference herein in their entirety.

TECHNICAL FIELD OF THE INVENTION

The present invention relates to the use of polyester surfactants containing a condensation esterification product of a polyhydric alcohol, a multimeric acid, and at least one polyalkylene glycol for flotation deinking under traditional alkaline, reduced alkali, and true neutral deinking conditions.

BACKGROUND OF THE INVENTION

The paper industry has been practicing waste paper recycling to regenerate usable cellulosic fiber for paper making for many decades. In these processes, ink removal from the waste paper pulp is improved using a suitable deinking composition. By controlling the deinking process, a recycling mill can affect the properties of the pulp such as the brightness and can improve the usability of the cellulosic fiber for paper manufacturing.

Deinking consists of a series of complex chemical and physical processes. These events include but are not limited to ink detachment, ink dispersion, ink collection, ink transport, and removal of inks from the waste paper pulp slurry. Each of these microprocesses have different surface and interfacial demands within the recycling operation in order to efficiently and effectively deink waste paper and produce quality paper.

Conventionally, two general approaches have been employed to remove ink in order to produce the deinked fiber after repulping. These two approaches are flotation and wash deinking. Often, processes contain both flotation and wash deinking and can be referred to as combination deinking processes. The underlying chemical and physical requirements to successfully deink are different for wash, flotation, and combination deinking processes.

More specifically, flotation/washing combination deinking refers to a deinking process wherein the ink released from the fiber is separated from the cellulosic fibers primarily through the flotation devices or flotation cells of the recycling process prior to passing the pulp through washing stages. Alternatively, washing/flotation combination deinking refers to a deinking process wherein the ink released from the fiber is separated from the cellulosic fibers primarily through the washing devices of the recycling process prior to passing the pulp through flotation stages. Wash deinking, on the other hand, refers to a deinking process wherein the ink released from the fiber is separated from the cellulosic fibers in the washing stages.

Flotation processes are fundamentally different than washing processes. This difference is partly because the ink size and hydrophobicity are important for favorable separation. Flotation methods of ink removal generally involve passing air bubbles through an aqueous system containing dispersed cellulose fiber that is most often produced via a repulping process. The resulting repulped cellulose fiber slurry having therein additives added either before, during, or after repulping. As the air bubbles rise within the fiber slurry and carry the ink particles with them, they generate foam which is enriched in ink that is subsequently removed from the flotation cell. The amount of foam that is typically favored in flotation deinking systems is an amount which can be collected by skimming, decanting, or other means, and which transports with it an enriched concentration of ink while minimizing the amount of other solids such as fibers that are rejected.

Flotation deinking generally utilizes different surfactants than washing because the resulting surface properties and size of the ink particles that is beneficial for flotation deinking is different than is desirable for wash deinking Examples of traditional nonionic surfactants that may be used in the flotation deinking process include alkylene oxide adducts of fatty alcohols, alkylphenols, fatty acids, and alkanolamides. Such nonionic surfactant deinking agents may be used either by themselves or in combination with one another and can also be blended with nonalkoxylated fatty acids and fatty alcohols. Flotation deinking has historically relied on a high pH pulping liquor to remove ink from the fiber and facilitate efficient usage of pulper bleach additives.

Wash deinking typically requires fine dispersion of ink. The ink and fiber are uniformly distributed throughout the slurry, and foaming or bubble formation, though present, is not particularly desired. The objective in the washing process is to release the ink from the fiber into an aqueous medium and then separate the fiber from the aqueous medium. Thus, the washing method comprises repulping, preferably under low-foaming conditions, of secondary fiber in an ink-removing aqueous medium whereby the ink (and other non-cellulosic contaminants, if present) is mechanically and/or chemically removed as desired from the fiber. The repulping step is typically followed by dilution and/or screening. Certain surfactants are known to those skilled in the art to modify interfacial properties successfully for wash deinking. These surfactants, however, also modify the ink into a hydrophilic dispersed state that favors the washing method.

Washing and flotation processes both depend on the proper use of surfactant. Depending on the relative contributions and characteristics of the hydrophilic and hydrophobic portions of the surfactant molecule, the surfactant's interaction with the ink will vary as ink particles will be rendered either more hydrophilic for washing purposes or more hydrophobic for flotation. The different natures of wash surfactant and flotation surfactant can lead to inefficiency in combination deinking systems. The deinking mechanism for washing is quite different from that for flotation and, therefore, they often require the use of deinking compositions having different properties.

Typically, either a flotation-derived or washing-derived deinking chemistry is utilized in a given deinking system. At some point in either process, the deinked, repulped waste paper is often passed through a series of fine cleaners and/or screens where the small particulate contaminants (e.g., sand and grit) are removed. Additional processing stages may be required such as, for example, dispersion, to reduce the particle size of any contaminants, or a special cleaning stage with special cleaners designed to remove specific contaminants.

The chemistry involved in traditional deinking very often involves addition of caustic soda in the repulper to increase the pH, often greater than 9 and sometimes greater than 10. Increasing the pH, however, can cause yellowing and darkening of the waste paper stock, especially when the waste paper contains groundwood or mechanical pulps. To counteract this undesirable darkening effect, a bleaching additive can be added to increase the whiteness and brightness of the pulp. The deinked waste paper is then held in storage until it is eventually fed to a papermaking machine.

Surfactant-based deinking aids, especially nonionic surfactants, can be good ink detachment agents. Nonionic surfactants can also assist in ink collection. If not properly chosen, however, these additives can also hinder ink collection in flotation containing processes. It is well known that traditional fatty acid soaps are efficient ink collectors in alkaline systems (pH greater than 9), although these soaps can lead to deposit concerns later in the process.

Traditional nonionic surfactants used in deinking are typically formed through alkoxylation, which includes, but is not limited to, ethylene oxide and propylene oxide. A base hydrophobe, often an alcohol or fatty acid, is reacted with ethylene oxide or propylene oxide or both. The order of addition can affect the final structure and properties. Alternately, propylene and ethylene oxide are reacted together to form block or random copolymers. These reactions can require specialized equipment.

U.S. Pat. No. 5,643,409 discloses a deinking agent obtained by the addition of an alkylene oxide to a polyfunctional alcohol having 1 to 10 carbon atoms and/or a polyfunctional fatty acid having 1 to 10 carbon atoms. U.S. Pat. No. 5,801,135 discloses nonionic surfactants obtained by the random-addition and/or block-addition reaction of an alkylene oxide having 2 to 4 carbon atoms to alcohols, amines or fatty acids each having hydrogens activated for additions, or fatty esters thereof. EP 0488306 discloses deinking agents made by esterifying dicarboxylic acids such as an alkylsuccinic acid or an alkenylsuccinic acid with a polyoxyalkylene alkyl ether or a polyoxyalkylene alkenyl ether. U.S. Pat. No. 5,736,622 describes a deinking collector which includes a polyester obtained by reaction between a polyalkylene glycol, di and/or tricarboxylic acid and/or anhydrides thereof as well as a saturated fatty acid with 12-18 carbons. U.S. Pat. No. 5,120,397 describes a deinking composition which is the reaction product obtained by reacting a natural oil or fat, or a reaction product of a natural oil or fat with glycerin, with a hexahydric alcohol to obtain an ester mixture and subsequently reacting the ester mixture with ethylene oxide and propylene oxide. U.S. Pat. No. 5,228,953 describes an additive comprising a polyglycol and a complex mixture of esters formed from $C_1$-$C_{20}$ alcohols esterified with phosphoric acid for flotation deinking of waste paper. U.S. Pat. No. 5,304,316 describes a deinking agent obtained by reacting an ethoxylated and propoxylated fatty acid or an ethoxylated and propoxylated incomplete ester of a polyhydric alcohol with a dicarboxylic acid or an anhydride thereof.

Traditional surfactant choices in deinking applications are often the result of blending multiple surfactants. A limited number of hydrophobes are available which are reacted with various amounts of alkoxylating agents. As such, there is a limitation to the properties than can be obtained by blending a fixed number of surfactants. In addition, manufacturing restrictions and/or economics can prohibit customization for individual applications.

Therefore, there is a need to develop and prepare functionally optimized deinking structures without the use of the standard alkoxylation protocol which can be produced economically and wherein changes can be easily accomplished to maximize the performance within a given, often single, molecular structure.

SUMMARY OF THE INVENTION

The present invention relates to polyester surfactants containing a condensation esterification product of a polyhydric alcohol, a multimeric acid, and at least one polyalkylene glycol for use in flotation deinking under traditional alkaline, reduced alkali, and true neutral deinking conditions. The polyester deinking surfactants of the present invention will effectively exhibit greater selectivity than traditional flotation deinking surfactants. In particular, the polyester deinking surfactants can give better foam control, improved yield, and no loss in ERIC reduction.

DETAILED DESCRIPTION OF THE INVENTION

The present invention relates to polyester surfactants containing a condensation product of a polyhydric alcohol, a multimeric acid, and at least one polyalkylene glycol for use in flotation deinking under traditional alkaline, reduced alkali, and true neutral deinking conditions. The condensation esterification used in the present invention allows for a wide range of structures. In addition, size, hydrophilic/lipophilic balance, foam characteristics, and ink collection can be tailored for a given condition. The polyester surfactants can have better selectivity, better system foam control, and higher yield relative to traditional deinking surfactants. These new materials can also perform more efficiently (work at lower concentrations than traditional deinking surfactants).

The present invention also relates to compositions and methods for deinking printed waste paper with the polyester deinking surfactants.

The polyester surfactants of the present invention can potentially impact deinking efficiency by, among other things, (1) enhancing release of the printed inks from the cellulosic fiber, (2) stabilizing the released inks in the aqueous phase to prevent them from depositing back onto the fiber, and (3) allowing the stabilized ink to be separated from the fiber. Therefore, the polyester surfactants used in the deinking composition of the invention have a positive effect on the resulting paper product as often demonstrated by a reduction in ERIC values. Additionally, there is also often a reduction in rejects (wet and/or dry) which indicates a gain in yield when the new polyester technology is utilized relative to conventional deinking surfactants.

The essential constituents of the polyester deinking surfactant comprise a condensation esterification product of a polyhydric alcohol, a multimeric acid, and at least one polyalkylene glycol. The polyester deinking surfactants of the present invention are represented by, but not limited to, the general formula:

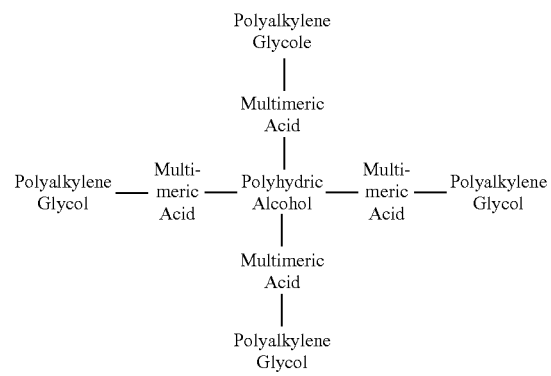

Polyhydric Alcohols:

Examples of general polyhydric alcohols used singly or in combination in the present invention to form polyester surfactants are, but not limited to, ethylene glycol, trimethylene glycol, 1,4-butanediol, 1,5-pentanediol, 1,6-hexanediol, 1,7-heptanediol, 1,8-octanediol, 1,9-nonanediol, 1,10-decanediol, 1,2-octanediol, 1,2-decanediol, hexylene glycol, diethylene glycol, triethylene glycol, tetraethylene glycol, dipropylene glycol, glycerol, arabitol, sorbitol, sorbitan, mannitol, mannitan, erythritol, pentaerythritol, or mixtures thereof. The most preferred polyol used in the present invention is pentaerythritol.

Multimeric Acids:

Examples of general multimeric acids used singly or in combination in the present invention to form polyester surfactants are, but not limited to, multimeric acids having between 2 to 42 carbon atoms. The carbon atoms may be linear or branched and saturated or unsaturated. Further, the multimeric acids may be monomeric, dimeric, or trimeric. Non-limiting examples of multimeric acids that may fall within that range are oxalic acid, malonic acid, succinic acid, glutaric acid, adipic acid, pimelic acid, suberic acid, azelaic acid, sebacic acid, ethylmalonic acid, 1-nonene-1,9-dicarboxylic acid, 2-nonene-1,9-dicarboxylic acid, 1-decene-1,10-dicarboxylic acid and 2-decene-1,10-dicarboxylic acid. The most preferred multimeric acid is a dimer of a C18 unsaturated acid.

Polyalkylene Glycols:

Examples of general polyalkylene glycols used singly or in combination in the present invention to form polyester surfactants are, but not limited to, a polymer of ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, 1,2-octanediol, 1,2-decanediol, butanoyl-α-glycol, 1,3-butanediol, trans-2-butene-1,4-diol, 2-butyne-1,4-diol, 2,4-pentanediol, 2,5-hexanediol, 2-methyl-1,3-pentanediol, hexylene glycol, 2,3-dimethyl-2,3-butanediol, 2,4-heptanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, 1,2-cyclononanediol, 1,2-cyclodecanediol, or mixtures thereof. The most preferred polyalkylene glycols are polyethylene glycol and polypropylene glycol.

Diluent:

The suitable diluent used for preparing the polyester surfactant of the present invention is a reaction product of a) polyalkylene glycol; b) carboxylic acid anhydride; and c) a sulfonic acid. The suitable diluent used is represented by, but not limited to, the following general formula:

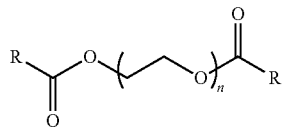

wherein n is 2-10 and R is C1-C8.

A) Polyalkylene Glycol:

Examples of general polyalkylene glycols used singly or in combination in the suitable diluent are, but not limited to, a polymer of ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, or mixtures thereof. The most preferred polyalkylene glycol is polyethylene glycol.

B) Carboxylic Acid Anhydride:

Examples of general carboxylic acid anhydrides used singly or in combination in the suitable diluent are, but not limited to, an anhydride of ethanoic acid, propanoic acid, butanoic acid, pentanoic acid, hexanoic acid, heptanoic acid, octanoic acid, nonanoic acid, or mixtures thereof. The most preferred carboxylic acid anhydride is the anhydride of ethanoic acid.

C) Sulfonic Acid:

Examples of general sulfonic acids used singly or in combination in the suitable diluent are, but not limited to, para-toluenesulfonic acid, camphorsulfonic acid, pyridine para-toluenesulfonate, methanesulfonic acid, trifluoromethanesulfonic acid, or mixtures thereof. The most preferred sulfonic acid is para-toluenesulfonic acid.

The polyester surfactants of the present invention can also be blended with fatty acids, synthetic deinking surfactants, and adjuvants to form compositions.

Fatty Acids:

Examples of general fatty acids used singly or in combination in the present invention as a blend with the polyester surfactants are, but not limited to, fatty acids having between 6 to 22 carbon atoms. Non-limiting examples of fatty acids are fatty acids derived from tall oil, coconut oil, palm oil, olive oil, soybean oil, rapeseed oil, linseed oil, lard, tallow, bone oil, corn oil, cocoa oil, castor oil, cotton seed oil, peanut oil, safflower oil, sesame oil, whale oil, or mixtures thereof. The most preferred fatty acid is the fatty acid derived from either tall oil or tallow.

Synthetic Deinking Surfactants:

Examples of synthetic deinking surfactants used singly or in combination as a blend with the polyester surfactants are, but not limited to, polypropylene triol, butoxy polypropylene polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylenes, alkoxylated alcohols, such as alkylpolyoxyethylene ethers and polyoxypropylene ethers, alkoxylated fatty acids, such as fatty acid polyoxyethylene esters, fatty acid polyoxypropylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, or mixtures thereof. The most preferred synthetic deinking surfactant is either an alkoxylated fatty acid or an alkoxylated fatty alcohol.

Adjuvants

Examples of adjuvants used singly or in combination as a blend with the polyester surfactants are, but not limited to, water, hexylene glycol, propylene glycol, diethylene glycol, dipropylene glycol, triethanol amine, furfuryl alcohol, ethanol, isopropyl alcohol, butanol or mixtures thereof. The most preferred adjuvant is hexylene glycol.

Formulations:

The final polyester surfactants may contain a condensation esterification product of a) about 0.1 wt % to about 6 wt % of a polyhydric alcohol; b) about 5 wt % to about 70 wt % of a multimeric acid; and c) about 0.1 wt % to about 90 wt % of at least one polyalkylene glycol.

The preferred polyester surfactants may contain a condensation esterification product of a) about 0.1 wt % to about 2 wt % of a polyhydric alcohol; b) about 10 wt % to about 30 wt % of a multimeric acid; and c) about 0.1 wt % to about 70 wt % of at least one polyalkylene glycol.

The condensation esterification reaction may take place in the presence of up to about 30 wt % of a suitable diluent. The preferred range for the diluent is up to about 15 wt %.

The polyester surfactants of the present invention may be prepared in any suitable manner known by one of ordinary skill in the art. The polyester surfactants are generally prepared in one step. About 1 molar equivalent of a polyol is treated with about 4 molar equivalents of a multimeric acid and about 1 to about 4 molar equivalents of at least one polyalkylene glycol in the presence of butylstannoic acid. The chemical structures can be altered by varying the stoichiometry of the multimeric acid and polyalkylene glycols. Additionally, the polyester surfactants of the present invention are usually solids at room temperature, but can be made into a liquid for easier processing by mixing with hexylene glycol, water, and alkoxylated fatty acid.

One of ordinary skill in the art will appreciate that the individual components of the present invention may change depending on the physical and chemical qualities needed for the polyester surfactants in a given process and/or application to which the polyester surfactants will be applied.

Uses:

The cost-effective and environmentally friendly polymeric surfactants are particularly useful as flotation and wash deinking agents in pulp and paper processing. The polymeric surfactants of the present invention can be applied in both alkaline and acidic processes in pulp mills. The polymeric surfactants function well in low and high ash systems and are not significantly affected by hard water, i.e. water containing greater than 300 ppm of calcium and magnesium salts. In addition, the polymeric surfactants can be either added directly to the pulper where they function as release agents and later when carried to the flotation cell act as a collector with improved selectivity or added directly to the flotation cell to assist in areas such as but not limited to modification of the foam and/or assist in collection.

The polymeric surfactants of the present invention are in no way limited only to the uses discussed above. As such, the polyester surfactants of the present invention can also be used in any industry that may require deinking or a closely analogous process.

Methods:

The deinking method of the invention is generally conducted by pulping printed waste paper materials in the presence of the deinking composition in a vessel that is commonly known in the art as a "pulper" or "repulper." Pulping is normally conducted under a specific set of conditions including temperature, pH, and water hardness. The present invention includes a method of deinking printed waste paper comprising the step of converting the printed waste paper to an aqueous pulp slurry in a pulper. The converting step occurs at a temperature ranging from about 25° C. to about 85° C. Preferably, the converting step occurs at a temperature ranging from about 30° C. to about 75° C. More preferably, the converting step occurs at a temperature ranging from about 35° C. to about 50° C. The aqueous pulp slurry comprises from about 3% to about 35% printed waste paper pulp by weight. Preferably, the aqueous pulp slurry comprises from about 10% to about 25% printed waste paper pulp by weight. This is often referred to as "pulping consistency," which is a term used in the paper industry to describe the concentration (w/v) of an aqueous slurry of pulp fibers.

The aqueous slurry may further comprise caustic or soda ash, a nonionic surfactant, a chelant, a peroxide, or a silicate, a fatty acid, or mixtures thereof. Preferably, concentrations of a sodium hydroxide or a soda ash range from about 0 pounds/ton of printed waste paper to about 50 pounds/ton of printed waste paper being deinked. Alternatively or in addition, concentrations of nonionic surfactant and/or fatty acids can range up to about 20 pounds/ton of printed waste paper being deinked. Chelant concentrations can range from about 0 pounds/ton of printed waste paper to about 6 pounds/ton of printed waste paper being deinked. Peroxide concentrations can range from about 0 pounds/ton of printed waste paper to about 50 pounds/ton of printed waste paper being deinked. Silicate concentrations can range up to about 60 pounds/ton of printed waste paper being deinked.

After the pulping step, the pulped aqueous slurry may be subjected to cleaning, screening, and washing stages where ink and other contaminants are separated from the cellulosic fiber stream. The deinked pulp may also be subsequently thickened and bleached to the target brightness prior to being sent to the paper machine where supplements, including but not limited to, strength aids, drainage aids, and/or paper sizing agents may be added. In general, paper is produced that meets certain specifications including brightness, count, strength, size (water repellency), and/or water absorbency levels.

The dosage of the polymeric surfactants is from about 0.1 pounds/ton printed waste paper being deinked to about 30 pounds/ton printed waste paper being deinked. Preferably, the dosage of the polymeric surfactants is from about 0.2 pounds/ton printed waste paper being deinked to about 20 pounds/ton printed waste paper being deinked. More preferably, the dosage of the polymeric surfactants is from about 0.3 pound/ton printed waste paper being deinked to about 15 pounds/ton printed waste paper being deinked.

The contacting step occurs during a period of from about 1 second to about 240 minutes. More preferably, the contacting step occurs during a period of from about 1 minute to about 150 minutes. The printed waste paper pulp is contacted with the polymeric surfactant at a pH of from about 1 to about 14. Preferably, the printed waste paper pulp is contacted with the polymeric surfactants at a pH of from about 6 to about 12.

Printed Waste Paper:

Printed waste paper comprises all printed paper materials including but not limited to, newsprint, magazines, telephone directories, printed advertising materials, laser printed materials, computer paper, legal documents, book stock, corrugated containers, tacky contaminants, or a mixture thereof. The printed waste paper comprises from about 0% to about 100% by weight newsprint.

Contaminants:

Adhesive or tacky contaminants that are often found in waste paper include pressure sensitive tape (e.g., acrylic contact adhesives), polyester hotmelt adhesive tape, seam bindings, labels, decals, stamps, and stickers (e.g., bumper stickers). These adhesives are often referred to as "stickies" in the paper making art. Stickies are a diverse mixture of synthetic polymeric organic materials. During the pulping process, stickies are liberated from secondary fiber due to the applied mechanical and thermal energy. Stickies do not disperse well in water and if carried-over with the recovered fiber they will either end up as "dirt spots" on the paper sheets or stick onto the wires, felts, or other paper making equipment which commonly requires the shutting down of such equipment in order to remove the stickies by solvent washing techniques. Other chemical and non-chemical methods for removing or reducing stickies contamination are well known in the art. Removal of these entities can be facilitated using the embodiments of this invention.

Ink Formulations:

Ink formulations used in the printing industry typically include one or more of a water-based ink, an oil-based ink, packaging ink, flexo ink, ink jet ink, pigment-based inkjet ink, thermal inkjet ink, or piezoelectric inkjet ink. These ink formulations, however, have become more and more complex and involve increasingly the use of a wide variety of synthetic resins and polymers. Further, increasing amounts of different paper types such as, but not limited to, xerographic copy paper are being used each year, and increasing amounts of impact and non-impact waste paper (i.e., ink jet and laser printed computer paper) are being recycled. Such paper, together with newsprint and magazines, often make up the principal sources for recycled waste paper. Furthermore, multicolored printing and multicolored advertisements have become increasingly important in recent years and these advertisements use a wide variety of new ink formulations—many of which incorporate atypical pigments, dyes, and toners. In one preferred embodiment, the printed waste paper comprises a water-based ink, an oil-based ink, packaging ink, flexo ink, ink jet ink, pigment-based ink jet ink, thermal ink jet ink, or piezoelectric ink jet ink. In an alternate embodiment, the printed waste paper comprises a hydrophilic ink.

Abbreviations And Definitions

"C(alkyl range)" is defined herein to independently include each member of that class as if specifically and separately set out. As a non-limiting example, the term "C1 to C18" independently represents each species that falls within the scope, including, but not limited to, methyl, ethyl, propyl, isopropyl, butyl, sec-butyl, iso-butyl, tert-butyl, pentyl, iso-pentyl, neo-pentyl, cyclopentyl, cyclopentyl, hexyl, 1-methylpentyl, 2-methylpentyl, 3-methylpentyl, 4-methylpentyl, 1-ethylbutyl, 2-ethylbutyl, 3-ethylbutyl, 4-ethyl butyl, cyclohexyl, heptyl, 1-methylhexyl, 2-methylhexyl, 3-methylhexyl, 4-methylhexyl, 5-methylhexyl, 6-methylhexyl, 1-ethylpentyl, 2-ethylpentyl, 3-ethylpentyl, 4-ethylpentyl, 5-ethylpenyl, 1-propylbutyl, 2-propylbutyl, 3-propybutyl, 4-propylbutyl, cycloheptyl, octyl, 1-methylheptyl, 2-methylheptyl, 3-methylheptyl, 4-methylheptyl, 5-methylheptyl, 6-methylheptyl, 7-methylheptyl, 1-ethylhexyl, 2-ethylhexyl, 3-ethylhexyl, 4-ethylhexyl, 5-ethylhexyl, 6-ethylhextyl, 1-propylpentyl, 2-propylpentyl, 3-propypentyl, 4-propylpentyl, 5-propylpentyl, cyclooctyl, nonyl, cyclononyl, or cyclodecyl.

"Fatty acid" is defined herein to mean a composition comprising a fatty acid of a uniform molecular weight—or a mixture of fatty acids having a distribution of molecular weights.

"Multimeric acid" is defined herein to mean a composition comprising monomer or dimer diacid or trimer triacid fatty acids of a uniform molecular weight—or a mixture of monomer or dimer diacids and/or trimer triacid fatty acids having a distribution of molecular weights.

"Printed waste paper" or "waste paper" is defined herein to mean newsprint, magazines, telephone directories, printed advertising materials, laser printed materials, computer paper, legal documents, book stock, corrugated containers, office papers, or a mixture thereof.

"Stickies" are defined herein to mean unwanted objects such as pressure sensitive tape (e.g., acrylic contact adhesives), polyester hotmelt adhesive tape, seam bindings, labels, decals, stamps, and stickers (e.g., bumper stickers) that are often found in waste paper.

"Ink Formulations" are defined herein to mean water-based ink, an oil-based ink, packaging ink, flexo ink, ink jet ink, pigment-based ink jet ink, thermal ink jet ink, and piezoelectric ink jet ink that are typically used in the printing industry.

"Effective residual ink concentration ("ERIC")" is defined herein to mean a value that is a measure of the effect of the remaining ink—or the overall darkening effect of the residual ink. The lower the ERIC value, the lower the amount of residual ink on the fiber. A lower ERIC value, therefore, is an indication of increased deinking performance. The ERIC value is conventionally used by mills, research facilities, and product development facilities to determine ink retention in paper sheet.

"Mixture" is defined herein to mean a heterogeneous association of substances which cannot be represented by a chemical formula. Its components may or may not be uniformly dispersed.

"Mix" is defined herein to mean effecting a uniform dispersion of liquid, semi-solid, or solid ingredients of a mixture by means of mechanical agitation.

"Blend" is defined herein to mean a mixture so combined as to render the parts indistinguishable from one another.

"Weight percent" or "wt %" is defined herein to mean the dry weight of a component divided by the total weight of the solution and multiplied by 100.

"Dose" is defined herein to mean the amount of polyester deinking surfactant needed to be added to a particular application or process to achieve a desired positive outcome.

"Foam" is defined herein to mean a dispersion of a gas (usually air) in a liquid or solid.

"Defoamer" is defined herein to mean a compound or composition used to inhibit the formation of foam or destroy existing foam.

"ONP" as used herein refers to old newspapers.
"OMG" as used herein refers to old magazines.
"MOW" as used herein refers to mixed office waste.
"PEG" as used herein refers to polyethylene glycol.
"PPG" as used herein refers to polypropylene glycol.
"PE" as used herein refers to pentaerythritol.
"HG" as used herein refers to hexylene glycol.
"HLB" as used herein refers to hydrophilic lipophylic balance.

"Room temperature" as used herein refers generally to temperatures in the range of 20 to 30° C., with an average temperature being 25° C.

EXAMPLES

Method of Testing

Printed waste papers are received from multiple geographic locations and mills. Additional details of the experimental procedure, if appropriate, are noted before each example.

In general, pulping used a total of 500 grams of wastepaper to form a 17% pulping consistency. Pulping utilized the Hobart Model H600T with an anvil mixing blade to deliver approximately 8 k Wh/dry ton of energy over 6 minutes.

If pulping was under traditional alkaline conditions, then caustic, silicate, and peroxide were added just prior to starting the pulping process. For reduced alkali conditions, only silicate was added prior to starting the pulping process. For neutral conditions, none of these three additives were added prior to starting the pulping process.

Flotation conditions are noted in the experimental details of each example. Typically 3 gram brightness pads were prepared in triplicate for the feed stock and the flotation accepts and reported as an average. Additionally, the wet volume and dry mass of the rejects were also recorded.

Polyester formulas are illustrated in Examples 1 through 10 below along with their corresponding numerical designations, i.e., Polyester A.

Comparative Example

Lionsure® 737 is an alkoxylated fatty acid nonionic surfactant available from Kemira Chemicals, Inc.®

Example 1

Preparation of Diluent A

Diluent A, a modified polyol containing 62.4% polyethylene glycol 200 (PEG 200) and 37.5% acetic anhydride with 0.1% para toluene sulfonic acid (PTSA) was prepared from 312.5 grams of PEG 200, 187.5 grams of acetic anhydride and 5.0 grams of PTSA as follows: The PEG 200, acetic anhydride and PTSA were added to the reaction flask. A nitrogen sparge was applied for 20 minutes to displace the dissolved air. The nitrogen sparge was used continuously during the preparation of the sample. The mixture was slowly heated to 200° F. at which point the exothermic reaction raised the temperature to 305° F. The temperature was raised to 320° F. for 1 hour when an additional 6 grams of acetic anhydride were added. After mixing for an additional 70 minutes, the temperature was raised to 350° F. and vacuum was applied. The reaction was held at this temperature for 2 hours. The mixture was then air cooled to room temperature.

The resulting mixture was a clear, pale yellow liquid having a viscosity of 25 centipose as measured by a Brookfield viscometer, spindle 2, speed 60 at 25° C. The acid number of the mixture was 0.23.

Example 2

Preparation of Polyester A

Polyester A, containing 1.3% pentaerythritol (PE), 21.4% dimer acid C18 unsaturated (multimeric acid), 4.2% PEG 400, 59.2% PEG 3350, 4.0% polypropylene glycol 400 (PPG 425) 10% Diluent A and 0.2% tin butyl oxide (Fascat 4100) was prepared as follows: 20.0 grams of Diluent A, 2.6 grams of PE, 42.7 grams of multimeric acid, 8.3 grams of PEG 400, 118.6 grams of PEG 3350, 8.0 grams of PPG 425 and 0.4 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.14.

Example 3

Preparation of Polyester B

Polyester B, containing 80.0% Polyester A, and 20% alkoxylated fatty acid (FA) was prepared as follows: 80 grams of Polyester A and 20 grams of alkoxylated fatty acid (FA) were added to a mixing vessel. The temperature was raised to 150° F. and the mixture was stirred. The mixture was removed from the stirrer and air cooled to room temperature.

The resulting sample was a cream colored waxy solid.

Example 4

Preparation of Polyester C

Polyester C, containing 1% pentaerythritol (PE), 16.6% dimer acid C18 unsaturated (multimeric acid), 0.3% PEG 400, 45.9% PEG 3350, 6.2% polypropylene glycol 400 (PPG 425) 30% Diluent A and 0.2% tin butyl oxide (Fascat 4100) was prepared as follows: 60.0 grams of Diluent A, 1.98 grams of PE, 33.2 grams of multimeric acid, 0.58 grams of PEG 400, 91.8 grams of PEG 3350, 12.4 grams of PPG 425 and 0.4 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.24.

Example 5

Preparation of Polyester D

Polyester D, containing 0.8% pentaerythritol (PE), 13.9% dimer acid C18 unsaturated (multimeric acid), 2.5% PEG 400, 40.5% PEG 3350, 12.3% polypropylene glycol 400 (PPG 425) 30% Diluent A and 0.2% tin butyl oxide (Fascat 4100) was prepared as follows: 60.0 grams of Diluent A, 1.67 grams of PE, 27.7 grams of multimeric acid, 4.91 grams of PEG 400, 81.0 grams of PEG 3350, 24.6 grams of PPG 425 and 0.4 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.12.

Example 6

Preparation of Polyester E

Polyester E, containing 0.97% pentaerythritol (PE), 16.1% dimer acid C18 unsaturated (multimeric acid), 2.85% PEG 400, 47.0% PEG 3350, 3.0% polypropylene glycol 400 (PPG 425) 30% Diluent A and 0.2% tin butyl oxide (Fascat 4100) was prepared as follows: 60.0 grams of Diluent A, 1.93 grams of PE, 32.3 grams of multimeric acidacid, 5.7 grams of PEG 400, 94.1 grams of PEG 3350, 6.1 grams of PPG 425 and 0.4 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.6.

Example 7

Preparation of Polyester F

Polyester F, containing 1.24% pentaerythritol (PE), 20.74% dimer acid C18 unsaturated (multimeric acid), 3.66% PEG 400, 60.5% PEG 3350, 3.90% polypropylene glycol 400 (PPG 425), 10.0% Diluent A and 0.2% tin butyl oxide (Fascat 4100) was prepared as follows: 20.0 grams of Diluent A, 2.48 grams of PE, 41.5 grams of multimeric acid, 7.32 grams of PEG 400, 120.9 grams of PEG 3350, 7.80 grams of PPG 425 and 0.4 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.4

Example 8

Preparation of Polyester G

Polyester G, containing 2.94% PEG 200, 22.0% dimer acid C18 unsaturated (multimeric acid), 4.67% PEG 400, 57.8% PEG 3350, 4.14% polypropylene glycol 400 (PPG 425), 10.0% Diluent A and 0.2% tin butyl oxide (Fascat 4100) was prepared as follows: 25.0 grams of Diluent A, 7.25 grams of PEG 200, 55.1 grams of multimeric acid, 11.7 grams of PEG 400, 144.6 grams of PEG 3350, 10.4 grams of PPG 425 and 0.5 grams of Fascat 4100 were added to the reaction vessel. The vessel was purged with nitrogen for twenty minutes and continuously for the course of the reaction. The temperature was raised to 350° F. for two hours. The mixture was air cooled to 150° F., transferred from the reaction vessel and air cooled to room temperature.

The resulting sample was a cream colored, opaque waxy solid. The acid number was 0.2

Example 9

Preparation of Polyester H

Polyester H, containing 53.3% Polyester A, 13.3% alkoxylated fatty acid (FA), 13.3% water, and 20% hexylene glycol was prepared as follows: 32.0 grams of Polyester A, 8.0 grams of alkoxylated FA, 8.0 grams of water, and 12.0 grams of hexylene glycol were added to a mixing vessel. The temperature was raised to 150° F. and the mixture was stirred while being air cooled to room temperature.

The resulting blend was a clear yellow liquid.

Example 10

Preparation of Polyester I

Polyester I, containing 66.7% Polyester A, 13.3% water, and 20% hexylene glycol was prepared as follows: 40.0 grams of Polyester A, 8.0 grams of water, and 12.0 grams of hexylene glycol were added to a mixing vessel. The temperature was raised to 150° F. and the mixture was stirred while being air cooled to room temperature.

The resulting blend was a clear yellow liquid.

Example 11

Deinking Comparison to Industry Standard

The wastepaper utilized in this example is representative of the southeastern United States. The furnish mix is 100% ONP. The pulping and flotation occurred at 115° F. Pulping was performed at 17% consistency and 120 ppm hardness. 20 lb/ton caustic, 25 lb/ton silicate and 10 b/ton peroxide were used. The deinking surfactant was added at 2.5 lb/ton. Polyester A was run first and then the flotation time for the Comparative Example was run to the same wet reject value as an initial attempt to understand selectivity.

TABLE 1

| | Results with Equal Rejects | | | | | | | |
|---|---|---|---|---|---|---|---|---|
| | Feed | | Accepts | | Hyperwash | | Rejects | |
| | Bright | ERIC | Bright | ERIC | Bright | ERIC | Wet | Dry |
| Polyester A | 40.6 | 1181 | 46.3 | 678 | 53.1 | 264 | 1500 | 18.5 |
| Comparative Example | 41.3 | 1158 | 43.4 | 958 | 54.1 | 240 | 1500 | 15.8 |

Testing Results:

These results clearly demonstrate that when run to equal wet rejects there is a dramatic difference in the amount of ink removed from the system when the Polyester A sample was present compared to an industry standard synthetic nonionic alkoxylated surfactant (Comparative Example). Namely, the polyester samples result in much higher brightness and much lower ERIC values.

Example 12

Comparison of Polyester A to Match the Wet Rejects of Industry Standard

A similar test was conducted where the Comparative Example was run first and the length of the flotation for Polyester A was extended to match the wet rejects of the Comparative Example.

The wastepaper utilized in this example is representative of the southeastern United States. The furnish mix is 100% ONP. The pulping and flotation occurred at 115° F. Pulping was performed at 17% consistency and 120 ppm hardness. 20 lb/ton caustic, 25 lb/ton silicate and 10 b/ton peroxide were used. The deinking surfactant was added at 2.5 lb/ton.

TABLE 2

Results with Equal Rejects

| | Feed | | Accepts | | Hyperwash | | Rejects | |
|---|---|---|---|---|---|---|---|---|
| | Bright | ERIC | Bright | ERIC | Bright | ERIC | Wet | Dry |
| Comparative Example | 41.1 | 1154 | 46.7 | 660 | 53.9 | 253 | 1817 | 22.3 |
| Polyester A | 41.4 | 1125 | 49.7 | 474 | 53.6 | 242 | 1818 | 26.0 |

Testing Results:

These results clearly demonstrate that when run to equal wet rejects there is a dramatic difference in the amount of ink removed from the system when the Polyester A sample was present compared to an industry standard synthetic nonionic alkoxylated surfactant (Comparative Example). Namely, the polyester samples result in much higher brightness and much lower ERIC values. In this example Polyester A demonstrated less favorable dry reject results.

Example 13

Effect of Introducing Hexylene Glycol

Polyester A is a solid at room temperature. Work to formulate this material into a stable and easily pumpable liquid without disrupting the performance of the polyester was performed. Additional examples will further detail various formulation details. This example demonstrates that by introducing hexylene glycol (HG) and/or some material such as the Comparative Example, that suitable physical properties of the resulting formulation were obtained as well as that HG does not negatively impact the polyester performance.

Shown below are the flotation deinking performance results for the example formulated Polyester B as well as the addition of HG to the Polyester B formulation. The sample is a blend of 80% Polyester A with 20% Comparative Example. The furnish is 100% ONP. The sample was added at 2.5 lb/ton. The HG was added in the proportions listed in the following table.

TABLE 3

Results of Introducing Hexylene Glycol

| | Feed | | Accepts | | Hyperwash | | Rejects | |
|---|---|---|---|---|---|---|---|---|
| | Bright | ERIC | Bright | ERIC | Bright | ERIC | Wet | Dry |
| Polyester B | 41.4 | 1115 | 46.5 | 655 | 53.3 | 250 | 1560 | 19.7 |
| Polyester B + 25% HG | 41.5 | 1067 | 46.7 | 658 | 53.3 | 255 | 1550 | 18.9 |

Testing Results:

Clearly addition of a glycol such as HG does not in any way decrease the performance of Polyester B for the deinking application.

The addition of hexylene glycol lowers the viscosity of the melted material and lowers the temperature at which it becomes solid. The hexylene glycol allows for the preparation of Polymer H which contains water and is a clear yellow liquid at room temperature.

Physical properties for Polymer H versus Polymer A are in the following table.

TABLE 4

Properties of Polymer H and Polymer A

| | Polymer H | Polymer A |
|---|---|---|
| Appearance @ 25° C. | Clear yellow liquid | Waxy beige solid |
| pH, as is | 7.32 | |
| pH 10% in water | | 5.4 |
| Viscosity #2 @ 30 @ 25° C. | 780 cps | |
| Sp. Gravity | 1.034 | 1.108 |
| Melting Point | 15° C. | 54° C. |

Example 14

Testing Against Varying Alkalinity

Example 14 demonstrates the performance of additional polyesters relative to an industry standard traditional nonionic alkoxylated deinking surfactant, Comparative Example. The example evaluates the performance of this expanded set of polyesters over a range of industrially relevant alkalinity.

The wastepaper utilized in this example is representative of the southeastern United States. The furnish mix is 100% ONP. The pulping and flotation occurred at 115° F. Pulping was performed at a hardness of 120 ppm hardness. Flotation time was 6 minutes at a starting consistency of 1% in the Voith cell.

Part 1 furnish was pulped with 10 lb/ton of caustic, 25 lb/ton of silicate, and 10 lb/ton of peroxide. The pulper terminal pH was 9.2.

TABLE 5

| | Part 1. Results at pH 9.2 | | | | | | | |
|---|---|---|---|---|---|---|---|---|
| | Feed | | Accepts | | Hyperwash | | Rejects | |
| | Bright | ERIC | Bright | ERIC | Bright | ERIC | Wet | Dry |
| Polyester C | 40.6 | 1028 | 47.3 | 489 | 52.0 | 237 | 2260 | 21.8 |
| Polyester D | 41.5 | 968 | 46.7 | 544 | 51.7 | 260 | 2200 | 22.6 |
| Comparative Example | 41.1 | 991 | 46.8 | 534 | 52.2 | 239 | 2460 | 23.5 |
| Polyester E | 41.9 | 941 | 47.3 | 515 | 51.8 | 267 | 2325 | 22.7 |

Part 2 furnish was pulped without any caustic or peroxide, just 25 lb/ton of silicate. The pulper terminal pH was 8.5.

TABLE 6

| | Part 2. Results at pH 8.5 | | | | | | | |
|---|---|---|---|---|---|---|---|---|
| | Feed | | Accepts | | Hyperwash | | Rejects | |
| | Bright | ERIC | Bright | ERIC | Bright | ERIC | Wet | Dry |
| Polyester C | 40.3 | 966 | 45.0 | 578 | 48.77 | 292 | 2390 | 23.8 |
| Polyester D | 39.9 | 1039 | 44.9 | 614 | 49.27 | 282 | 2215 | 22.3 |
| Comparative Example | 39.3 | 1114 | 44.7 | 620 | 49.41 | 277 | 2556 | 26.3 |
| Polyester E | 39.9 | 1017 | 45.0 | 588 | 49.53 | 269 | 2258 | 21.4 |

Testing Results:

Under each pulping condition, the flotation results of Polyester D as measured by brightness gain and ERIC reduction, were similar to the traditional flotation deinking surfactant, Comparative Example. However, under each condition Polyester D achieved these similar optical results and lower wet and dry rejects clearly demonstrating the Polyester was providing increased selectivity of ink removal during the flotation process. Polyester C and Polyester E demonstrate superior optical and reject properties simultaneously clearly showing that these polyester material are providing superior selectivity of ink removal during flotation.

Example 15

Time Dependent Performance Study

This experiment was run using an alternative deinking cell that allows for time dependant studies to be performed on a single flotation feed. This example examines the performance versus continuous time in a Darmstadt flotation cell for Polyester F and Polyester A.

The wastepaper utilized in this example is representative of the southeastern United States. The furnish mix is 100% ONP. The pulping and flotation occurred at 115° F. Pulping was performed at 17% consistency and 120 ppm hardness. No caustic or peroxide were used. Silicate was added at 25 lb/ton. The deinking agents were added at 2.5 lb/ton. Flotation was done in a Darmstadt IfP Injector Flotation Cell at a consistence of 0.8%. Samples were taken every 2 minutes.

TABLE 7

| | Results of Time Dependent Study | | | | | | | |
|---|---|---|---|---|---|---|---|---|
| Time | No flotation additive | | Polyester F | | Polyester A | | Comparative Example | |
| Minutes | Rejects | ERIC | Rejects | ERIC | Rejects | ERIC | Rejects | ERIC |
| 1 | 91 | | 71 | | 49 | | 98 | |
| 2 | 193 | 964 | 150 | 819 | 108 | 778 | 197 | 849 |
| 3 | 272 | | 230 | | 161 | | 282 | |
| 4 | 352 | 910 | 299 | 791 | 205 | 742 | 356 | 813 |
| 5 | 420 | | 362 | | 253 | | 430 | |
| 6 | 484 | 827 | 407 | 741 | 286 | 710 | 498 | 760 |
| 7 | 537 | | 452 | | 319 | | 562 | |
| 8 | 581 | 799 | 489 | 677 | 350 | 660 | 624 | 705 |
| 9 | 616 | | 531 | | 381 | | 684 | |
| 10 | 646 | 795 | 570 | 658 | 412 | 639 | 758 | 667 |

Testing Results:

Example 15 demonstrates an improvement in efficiency using Polyester F and Polyester A compared to the traditional flotation deinking surfactant, Comparative Example. Compared to the blank which contains no deinking surfactant, each of the surfactant containing flotations demonstrates reduced ERIC. However, Polyester F and Polyester A both demonstrate superior optical and reject properties simultaneously relative to the Comparative Example, thus clearly showing that these polyester materials are providing superior selectivity of ink removal during flotation.

Example 16

Effect of Varying Dosage

An additional experiment was performed in the Darmstadt cell where in the dosage of Polyester A was fixed at 2#/t and the dosage of the Comparative Example was varied in order to evaluate approximate amounts of each chemical to obtain the same floated pulp properties.

The wastepaper utilized in this example is representative of the southeastern United States. The furnish mix is 100% ONP. The pulping and flotation occurred at 115° F. Pulping was performed at 17% consistency and 120 ppm hardness. No caustic or peroxide were used. Silicate was added at 25 lb/ton. The deinking agents were added at 2, 4, or 6 lb/ton. Flotation was done in a Darmstadt IfP Injector Flotation Cell at a consistence of 0.8%. Samples were taken every 2 minutes.

TABLE 8

Results of Varying Dosages

| Time | Polyester A @ 2 lb/t | | Comparative Example @ 2 lb/t | | Comparative Example @ 4 lb/t | | Comparative Example @ 6 lb/t | |
|---|---|---|---|---|---|---|---|---|
| Minutes | Rejects | ERIC | Rejects | ERIC | Rejects | ERIC | Rejects | ERIC |
| 1 | 72 | | 105 | | 106 | | 92 | |
| 2 | 147 | 765 | 214 | 925 | 204 | 792 | 182 | 806 |
| 3 | 202 | | 317 | | 294 | | 258 | |
| 4 | 250 | 741 | 409 | 829 | 376 | 760 | 320 | 737 |
| 5 | 285 | | 505 | | 459 | | 393 | |
| 6 | 348 | 651 | 600 | 785 | 544 | 713 | 471 | 674 |
| 7 | 397 | | 668 | | 621 | | 528 | |
| 8 | 439 | 666 | 740 | 714 | 697 | 695 | 595 | 628 |
| 9 | 475 | | 812 | | 762 | | 647 | |
| 10 | 519 | 644 | 872 | 697 | 834 | 632 | 697 | 572 |

Testing Results:

The ink removal during flotation, as evidenced by the ERIC reduction, improves as the dosage of the Comparative Example is increased. However, at no time was equal ink removal obtained using the Comparative Example at the same dose as Polyester A. Only at the extended flotation time of 10 minutes did the Comparative Example, when dosed at double the dose (4#/t) of Polyester A, achieve the same ink removal as Polyester A. In all, more than double the dosage of the Comparative Example was required to achieve the same ink removal as Polyester A.

Example 17

Effect of Using Deinking Agent as a Blend

The wastepaper utilized in this example is representative of the southeastern United States. The furnish mix is 80% ONP/20% OMG. The pulping and flotation occurred at 115° F. Pulping was performed at 17% consistency and 120 ppm hardness. 20 lb/ton of caustic and 10 lb/ton of peroxide were used. Silicate was added at 25 lb/ton. The deinking agents were blended with Tall Oil Fatty Acid (TOFA) at a 1/1 ratio. These blends were added at 2.5 lb/ton. Flotation was done for 20 minutes in a Darmstadt HP Injector Flotation Cell at a consistence of 0.8%. Samples were taken every 2 minutes.

TABLE 9

Results for Blended Deinking Agents

| Comparative Example Blend | | Polyester A Blend | |
|---|---|---|---|
| Rejects | ERIC | Rejects | ERIC |
| 316 | 788 | 316 | 719 |
| 471 | 723 | 420 | 667 |
| 587 | 654 | 514 | 639 |
| 703 | 608 | 721 | 577 |
| 831 | 589 | 821 | 539 |
| 926 | 537 | 926 | 504 |

Testing Results:

Example 17 demonstrates that when blended with Tall Oil Fatty Acid, a common flotation deinking additive, the same improvement in ERIC reduction as a function of rejects is present for Polyester A as was seen in the neat products.

Example 18

Effect of Polyesters in High Ash Systems

Some regions and/or mills operate at higher ash levels in the furnish. Increased ash can lead to unfavorable changes in reject level in some processes. Controlling system foam, especially in light of water loop closure and cycle up effects, is a major concern in some mills.

The furnish mix was 50% ONP and 50% MOW. The pulping and flotation occurred at 115° F. Pulping was performed at 17% consistency and 120 ppm hardness. Flotation was done for 3 minutes with a starting consistency of 1% in the Voith cell. The furnish was pulped with 10 lb/ton caustic, 25 lb/ton silicate and 10 lb/ton peroxide. The deinking aids were used at 2.5 lb/ton.

TABLE 10

Results in High Ash Systems

|  | Accepts | | Rejects | |
|---|---|---|---|---|
|  | Bright | ERIC | Wet | Dry |
| Comparative Example | 58.3 | 341 | 2600 | 41.9 |
| Polyester G | 58.4 | 341 | 2200 | 42.1 |

Testing Results:

These results clearly show the relative effectiveness of polyester surfactants in a system composed of increased content of MOW and therefore increased content of ash. Equivalent optical properties in terms of ink removal during flotation were obtained at notably lower wet rejects which could in some mills and for some processes allow additional flexibility in use of deinking aids in systems that are constrained by foam volumes.

Example 19

Effect of Adding Polyester Prior to Flotation

Deinking agents can be added at different points in the system. This test demonstrates the use of an example polyester, Polyester A, added directly prior to flotation.

The wastepaper utilized in this example is representative of the southeastern United States. The furnish mix is 80% ONP and 20% OMG. The pulping and flotation occurred at 115° F. Pulping was performed at 17% consistency and 120 ppm hardness. Flotation was done for 3 minutes with a starting consistency of 1% in the Voith cell. The furnish was pulped with 10 lb/ton caustic, 25 lb/ton silicate and 10 lb/ton peroxide. One lb/ton of polyester surfactant 251-88 was add to the flotation cell for each flotation. The pulping was done with 2 or 3 lb/ton of traditional flotation deinking surfactant, Comparative Example, or 8 lb/ton of TOFA (tall oil fatty acid).

TABLE 11

Results for Polyester A Added Prior to Flotation

|  | Feed | | Accepts | | Hyperwash | | Rejects | |
|---|---|---|---|---|---|---|---|---|
|  | Bright | ERIC | Bright | ERIC | Bright | ERIC | Wet | Dry |
| 2 lb Comparative Example (pulper) | 43.3 | 1046 | 48.9 | 615 | 57.7 | 212 | 1380 | 18 |
| Above plus 1 lb Polyester A (Flotation) | 43.3 | 1046 | 49.8 | 581 | 58.0 | 210 | 1298 | 17.8 |
| 8.0 lb Fatty acid (pulper) | 41.3 | 1220 | 49.9 | 625 | 58.5 | 215 | 1360 | 20.2 |
| Above plus 1 lb Polyester A (Flotation) | 41.3 | 1220 | 50.3 | 602 | 58.4 | 215 | 1280 | 18.6 |

Testing Results:

The results clearly demonstrate that the Polyesters, when added as a pre-flotation additive to complement previously added traditional pulping additives, can improve both optical properties of the pulp (increased ink removal and ERIC reduction) while also reducing the wet and/or dry rejects.

Example 20

Effect of Adding Polyester Blends Prior to Flotation

Deinking agents can be added at different points in the system. This test demonstrates the use of formulated blends of various polyesters added directly prior to flotation. The test conditions are as in Example 19 with a constant dosage of 2 lb/ton of the Comparative Example added to the pulper.

TABLE 12

Results for Polyester Blends Added Prior to Flotation

| Float Cell | Feed | | Accepts | | Hyperwash | | Rejects | |
|---|---|---|---|---|---|---|---|---|
| Additive | Bright | ERIC | Bright | ERIC | Bright | ERIC | Wet | Dry |
| 1.0# Polyester H | 43.3 | 1058 | 50.7 | 547 | 58.3 | 194 | 1310 | 18.9 |
| 1.0# Polyester I | 43.3 | 1058 | 50.7 | 563 | 58.8 | 188 | 1320 | 18.5 |
| No flotation additive | 43.3 | 1046 | 48.9 | 615 | 57.7 | 212 | 1380 | 18.0 |

Testing Results:

The addition of the formulated polyesters samples to the flotation feed clearly improved the ink removal selectivity during flotation and the final optical properties of the accepts from flotation.

SUMMARY AND CONCLUSIONS

All patents, patent applications and publications cited in this application are hereby incorporated by reference in their entirety for all purposes to the same extent as if each individual patent, patent application or publication were so individually denoted.

Although certain embodiments and examples have been described in detail above, those having ordinary skill in the art will clearly understand that many modifications are possible in the embodiments and examples without departing from the teachings thereof. All such modifications are intended to be encompassed within the below claims of the invention.

What is claimed is:

1. A method of deinking printed waste paper that comprises ink and paper pulp, comprising:
    a) converting the printed waste paper to an aqueous pulp slurry in a repulper;
    b) contacting the aqueous pulp slurry with the addition of a composition comprising a polyester surfactant, the polyester surfactant consisting of a condensation esterification product of a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol;
    c) separating the ink in the aqueous pulp slurry; and
    d) recovering deinked paper pulp from the aqueous pulp slurry.

2. The method of claim 1, wherein the composition comprising the polyester surfactant is provided in an amount of from about 0.1 pound per ton to about 30 pounds per ton based on the weight of the printed waste paper.

3. The method of claim 1, wherein the aqueous pulp slurry has a pH ranging from about 6 to about 12.

4. The method of claim 1, wherein the composition comprising the polyester surfactant is a blend of the polyester surfactant with C6 to C22 fatty acids.

5. The method of claim 1, wherein the composition comprising the polyester surfactant is a blend of the polyester surfactant with a polyol selected from ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, 1,2-octanediol, 1,2-decanediol, butanoyl-α-glycol, 1,3-butanediol, trans-2-butene-1,4-diol, 2-butyne-1,4-diol, 2,4-pentanediol, 2,5-hexanediol, 2-methyl-1,3-pentanediol, hexylene glycol, 2,3-dimethyl-2,3-butanediol, 2,4-heptanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, 1,2-cyclononanediol, 1,2-cyclodecanediol, or mixtures thereof.

6. The method of claim 1, wherein the polyester surfactant is blended with a second synthetic deinking surfactant in the composition comprising the polyester surfactant.

7. The method of claim 6, wherein the second synthetic deinking surfactant is selected from polypropylene triol, butoxy polypropylene polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxypropylene esters, fatty acid polyoxyethylene sorbitan esters, fatty acid polyoxypropylene sorbitol esters, polyoxyethylene castor oils, alkylpolyoxyethylene amines and amides, fatty acid sorbitan esters, fatty acid polyglycerin esters, fatty acid sucrose esters, or mixtures thereof.

8. The method of claim 7, wherein the second synthetic deinking surfactant is an alkoxylated fatty acid, alkoxylated alcohol, or mixtures thereof.

9. The method of claim 1, wherein the composition comprising a polyester surfactant is added into one of a pulper and a flotation cell.

10. A method of preparing a polyester surfactant comprising a step of mixing and reacting a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol in a condensation esterification reaction, wherein the polyester surfactant consisting of a condensation esterification product of a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol.

11. The method of claim 10, wherein the polyester surfactant is prepared by mixing a) about 0.1 wt % to about 6 wt % of the polyhydric alcohol; b) about 5 wt % to about 70 wt % of the dimer or trimer of an C2 to C42 acid; and c) about 0.1 wt % to about 90 wt % of the polyethylene glycol and polypropylene glycol.

12. The method of claim 10, wherein the condensation esterification reaction takes place in the presence of up to about 30 wt % of a suitable diluent.

13. The method of claim 12, wherein the suitable diluent is a reaction product of a) about 20 wt % to about 80 wt % of a polyethylene glycol; b) about 10 wt % to about 60 wt % of acetic anhydride; and c) up to about 0.9 wt % of para-toluenesulfonic acid.

14. A method of removing adhesive impurities comprising stickies from printed waste paper during pulp making, comprising:
    a) converting the printed waste paper to an aqueous pulp slurry in a repulper;
    b) contacting the aqueous pulp slurry with the addition of a composition comprising a polyester surfactant, the polyester surfactant consisting of a condensation esterification product of a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol;
    c) separating the stickies in the aqueous pulp slurry; and
    d) recovering the paper pulp from the aqueous pulp slurry that is free of stickies.

15. The method of claim 14, wherein the aqueous pulp slurry has a pH ranging from about 6 to about 12.

16. The method of claim 14, wherein the composition comprising the polyester surfactant is a blend of the polyester surfactant with C6 to C22 fatty acids.

17. The method of claim 14, wherein the composition comprising the polyester surfactant is a blend of the polyester surfactant with a polyol selected from ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, 1,2-octanediol, 1,2-decanediol, butanoyl-α-glycol, 1,3-butanediol, trans-2-butene-1,4-diol, 2-butyne-1,4-diol, 2,4-pentanediol, 2,5-hexanediol, 2-methyl-1,3-pentanediol, hexylene glycol, 2,3-dimethyl-2,3-butanediol, 2,4-heptanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, 1,2-cyclononanediol, 1,2-cyclodecanediol, or mixtures thereof.

18. The method of claim 14, wherein the composition comprising the polyester surfactant is a blend of the polyester surfactant with a second synthetic deinking surfactant.

19. The method of claim 18, wherein the second synthetic deinking surfactant is selected from polypropylene triol, butoxy polypropylene polyethylene glycol, alkoxylated dimethylpolysiloxane, alkyl modified siloxanes, fluorine modified siloxanes, mercapto modified siloxanes, hydroxy modified siloxanes, siloxane wax, ethylene oxide/propylene oxide block copolymer, the esters of polyethylene glycol, polypropylene glycol, polypropylene triol, butoxy polypropylene polyethylene glycol, ethylene oxide/propylene oxide block copolymer, alkylpolyoxyethylene ethers, alkylpolyoxyethylenes, polyoxypropylene ethers, fatty acid polyoxyethylene esters, fatty acid polyoxypropylene esters, fatty acid polyoxyethylene sorbitan esters, fatty acid polyoxypropylene sorbitan esters, polyoxyethylene castor oils, alkylpolyoxyethylene amines and amides, fatty acid sorbitan esters, fatty acid polyglycerin esters, fatty acid sucrose esters, or mixtures thereof.

20. The method of claim 19, wherein the second synthetic deinking surfactant is an alkoxylated fatty acid, alkoxylated alcohol, or mixtures thereof.

21. A polyester surfactant for deinking printed waste paper consisting of a condensation esterification product of a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol.

22. The polyester surfactant of claim 21, wherein a) the polyhydric alcohol is present in about 0.1 wt % to about 6 wt %; b) the dimer or trimer of an C2 to C42 acid is present in about 5 wt % to about 70 wt %; and c) the polyethylene glycol and polypropylene glycol is present in about 0.1 wt % to about 90 wt %.

23. The polyester surfactant of claim 22, wherein the polyhydric alcohol is present in about 0.1 wt % to about 2 wt %.

24. The polyester surfactant of claim 22, wherein the dimer or trimer of an C2 to C42 acid is present in about 10 wt % to about 30 wt %.

25. The polyester surfactant of claim 22, wherein the dimer or trimer of an C2 to C42 acid is a dimer of a C18 acid and is saturated.

26. The polyester surfactant of claim 22, wherein the dimer or trimer of an C2 to C42 acid is a dimer of a C18 acid and is unsaturated.

27. The polyester surfactant of claim 22, wherein the polyethylene glycol and polypropylene glycol are present in comprises about 0.1 wt % to about 70 wt %.

28. A composition for deinking printed waste paper comprising a polyester surfactant consisting of a condensation esterification product of a) a polyhydric alcohol selected from the group consisting of glycerol, arabitol, sorbitol, sorbitan, mannitol, mannitan, erythritol, pentaerythritol, and mixtures thereof, b) a dimer or trimer of an C2 to C42 acid, and c) polyethylene glycol and polypropylene glycol.

29. The composition of claim 28, wherein the polyester surfactant is prepared by mixing a) about 0.1 wt % to about 6 wt % of the polyhydric alcohol; b) about 5 wt % to about 70 wt % of the dimer or trimer of an C2 to C42 acid; and c) about 0.1 wt % to about 90 wt % of the polyethylene glycol and polypropylene glycol.

30. The composition of claim 29, wherein the surfactant contains the polyhydric alcohol in about 0.1 wt % to about 2 wt %.

31. The composition of claim 29, wherein the surfactant contains the dimer or trimer of an C2 to C42 acid in about 10 wt % to about 30 wt %.

32. The composition of claim 29, wherein the dimer or trimer of an C2 to C42 acid is the dimer of a C18 acid and is saturated.

33. The composition of claim 29, wherein the dimer or trimer of an C2 to C42 acid is the dimer of a C18 acid and is unsaturated.

34. The composition of claim 29, wherein the surfactant contains the polyethylene glycol and polypropylene glycol in about 0.1 wt % to about 70 wt % of the polyethylene glycol and polypropylene glycol.

\* \* \* \* \*